United States Patent [19]

Weaver

[11] 4,401,404
[45] Aug. 30, 1983

[54] SILO STRUCTURE

[76] Inventor: Richard L. Weaver, R.D. #4, Myerstown, Pa. 17067

[21] Appl. No.: 354,523

[22] Filed: Mar. 3, 1982

Related U.S. Application Data

[63] Continuation of Ser. No. 41,304, May 22, 1979, abandoned.

[51] Int. Cl.$^3$ .............................................. A01F 25/16
[52] U.S. Cl. ................................... 414/292; 414/293; 414/310; 99/646 S
[58] Field of Search ............... 406/124, 125, 126, 116; 414/217, 292, 293, 310, 311, 312; 137/203, 204, ; 99/646 S, 467; 98/55

[56] References Cited

U.S. PATENT DOCUMENTS

| | | | |
|---|---|---|---|
| 2,178,934 | 11/1939 | Hamilton | 406/116 |
| 2,337,789 | 12/1943 | Whitney | 137/204 |
| 3,318,229 | 5/1967 | Hansen | 99/646 X |
| 3,459,457 | 8/1969 | Weaver et al. | 99/646 S X |
| 3,528,360 | 9/1970 | Broberg | 99/646 S |
| 4,067,623 | 1/1978 | Klein et al. | 406/124 |

FOREIGN PATENT DOCUMENTS 620744 11/1935 Fed. Rep. of Germany .......... 98/55

*Primary Examiner*—Robert J. Spar
*Assistant Examiner*—Ken Muncy
*Attorney, Agent, or Firm*—Paul & Paul

[57]  ABSTRACT

A storage silo, for agricultural products and the like is provided, particularly adapted for use with silos of the bottom unloader type, and which are filled through a fill pipe extending from about ground level, to the upper end of the silo. A particularly unique connection is provided between the top and bottom of the silo, for substantially eliminating a pressure differential between the top and bottom that could otherwise have adverse affects on the silage upon filling at the side. The interconnection between the top and the bottom is through the silo fill pipe, and a vent line, and additionally may be provided for including silage gas bags in common interconnection with the fill pipe. The bottom end of the fill pipe is telescopically extendable for attachment to a silage blower, and a closure for the bottom end of the fill pipe is adapted to sealingly close the fill pipe with the telescopically extendable member within the fill pipe. Additionally, the discharge at the upper end of the fill pipe is toward the center of the silo, and the fill pipe extends into the silo an amount at least as far as the vent opening in the roof. A drip sheet, terminating in a downwardly sloped drip edge, spaced outwardly from the upper end of the silo, but circumferentially around the silo, is provided, for discharging rain and the like away from the silo wall to eliminate staining

4 Claims, 2 Drawing Figures

SILO STRUCTURE

This is a continuation of application Ser. No. 041,304, filed May 22, 1979, now abandoned.

BACKGROUND OF THE INVENTION

In the prior art, bottom unloader augers, with means provided for central discharge through the bottom, of silage, is well known. An example of a silo center discharge, and an auger adaptable for use therewith, at the bottom of a silo, is present in my prior U.S. Pat. No. 4,057,151. The center discharge openings generally have covers, and these may be constructed like the teachings of my U.S. Pat. No. 4,057,153. In bottom unloaders, as the auger moves around the bottom of the silo (which auger can be constructed like that set forth in my U.S. Pat. No. 4,095,703), silage is discharged toward the bottom opening, and may later be conveyed outwardly from the silo, by other means. Except when the silage is being discharged through the bottom opening, the cover for the bottom opening is generally kept shut, in order to minimize oxygen inflow into the system.

This is because, the inflow of oxygen into the system will cause a certain amount of oxidation of the silage therein, whether it be hay, grain, or any other agricultural product. Each oxidation thereby effects the loss of a certain amount of silage, and it is preferably avoided.

When silos are filled from an outside pipe, the silage may be blown into the top of the silo toward the center thereof, and preferably toward a central deflector, in an arrangement similar to that shown in my U.S. Pat. No. 4,052,108. It has been found that, when the silo is being filled, because of the volume of material and air that is being driven into the top of the silo through the fill pipe, provision must be made for the displacement of air (or gas, including air) from the top of the silo. To this end, an openable lid at the top of the silo is generally used to facilitate venting and such displacement, when the silo is being filled. The lid is generally promptly closed after the filling takes place. As the silage in the silo becomes heated, often from the action of the sun, or even if not heated from the sun, if it becomes warm because of oxidation, it often happens that a higher pressure becomes present in the silo, above the level of the silage therein. This may in part be due to the tendency of heat to rise, but in any event, generally effects a higher pressure zone at the top of the silo, above the silage. When this happens, if the cover on the bottom of the silo center discharge is opened, the pressure differential between the top and bottom of the silo may cause air containing the customary amounts of oxygen, to be drawn into the bottom of the silo, in a rapid sucking action.

The present invention is directed toward eliminating, or substantially eliminating the pressure differential through the silage, from top to bottom, by providing a duct from the top to the bottom, that communicates the zone at about the bottom opening of the silo, with the zone inside the silo above the silage, and that preferably additionally communicates with gas bags reserved for preventing loss of the silo gases having desirable qualities such as reduced oxygen content, higher heat, greater humidity, etc. Accordingly, a conduit provides connection between the top and the bottom of the silo, as well as communication with silo gas bags. This is the essence of this invention, particularly, the utilization of the silo fill pipe, and a vent connected thereto at its bottom, that in turn is connected to the gas bags and the fill opening. Additionally, the bottom of the fill pipe has a telescopic member for adaption to fill equipment, and additionally, is sealed by means of an openable closure at its lower end, located below the communication of the vent with the fill pipe, for acting as a moisture trap when the closure is closed. Furthermore, the upper end of the fill pipe extends into the silo beyond the location of the roof vent. This latter feature has been found to effect less carrying of silage and dust out of the upper end of the silo during the filling operation, as has been experienced with vent openings conventionally placed in the roofs, and with fill pipes that terminate at the silo wall, rather than extending inwardly past the vent opening.

In the constructions of silos, it has often been found that silage dust and rainwater effect a staining of the silo walls, in that rainwater picks up accumulated dust on the roof, and runs downwardly therefrom staining the wall of the silo.

The present invention applies a drip member around the upper edge of the silo, that is generally frusto-conical in configuration, terminating at its lower end in a drop edge, whereby rainwater, melting snow and the like carrying particles may be dropped from the upper end of the silo, at a location located six inches, more or less, from the silo wall, so that they will not run down the silo from its upper end staining the same. Additionally, by constructing the drip member as two surfaces having a common juncture, one said surface may be generally cylindrical and upstanding, and may be bolted or otherwise carried to an imbedded reinforcing member in the concrete, and thereby allow its use as a peripheral form for the poured concrete roof, which form remains in place, after hardening of the concrete, and serves to hold the outwardly extending peripheral sheet previously described that provides the discussed drip edge.

SUMMARY OF THE INVENTION

Accordingly, the present invention provides sealed communication from the top to the bottom of a silo, for effecting substantially the same pressure at each such location. Additionally, there is provided connection to the silo bags, for communication between not only the top and bottom of the silo, but the silo gas bags. Another important feature of this invention resides in the introduction of silage through the fill pipe, into the upper end of the silo toward a deflector, with the fill pipe extending beyond the vent opening in the roof of the silo. A telescopic fill is provided at the lower end of the fill pipe. An additional feature resides in the location of a connection of the fill pipe to the gas bags and bottom discharge opening, that is sufficiently high above a bottom closure for the fill pipe, that a lower portion of the fill pipe above the closure and beneath the vent connection may act as a moisture trap. Additionally, the use of a sheet protruding outwardly from the upper end of the silo, as a drip member to prevent staining is an additional of the invention. Furthermore, the use of a portion of the drip member as a form for the periphery of the roof provides an additional inventive feature.

CROSS REFERENCE TO OTHER PATENTS

Reference is made to U.S. Pat. Nos. 4,052,108, 4,057,151, 4,057,153, and 4,095,703, the disclosures of which are all incorporated by reference herewith, in that they each disclose features of silo structures, lids and deflectors, augers, bottom discharge structures for silos, covers for the discharge openings, auger drives, and other features that will facilitate and enhance an understanding of the present invention, by way of background, and which will avoid the need for lengthy duplication of drawings and description herein, thereby facilitating the focusing herein on the principal features of the present invention.

BRIEF DESCRIPTIONS OF THE DRAWING FIGURES

FIG. 1 is a vertical sectional view, partially schematic, and taken through a silo in accordance with this invention, illustrating the manner in which a fill pipe blows silage into the upper end of the silo, and the location of an auger and discharge at the lower end of the silo, as well as the connection of the telescopic lower end of the silo to the bottom opening and silo gas bags. Additionally, the roof vent for the silo is shown in both full line and phantom positions, for facilitating an ease of understanding of the manner in which a winch-operated cable connection facilitates opening of the vent upon filling the silo.

FIG. 2 is a generally vertical sectional view, illustrating the bottom of the silo fill pipe, in both full line and phantom positions, the phantom position illustrating the telescopic extension thereof, and with the sealing closure being further illustrated.

DETAILED DESCRIPTION OF THE PREFERRED EMBODIMENTS

Figure 1:
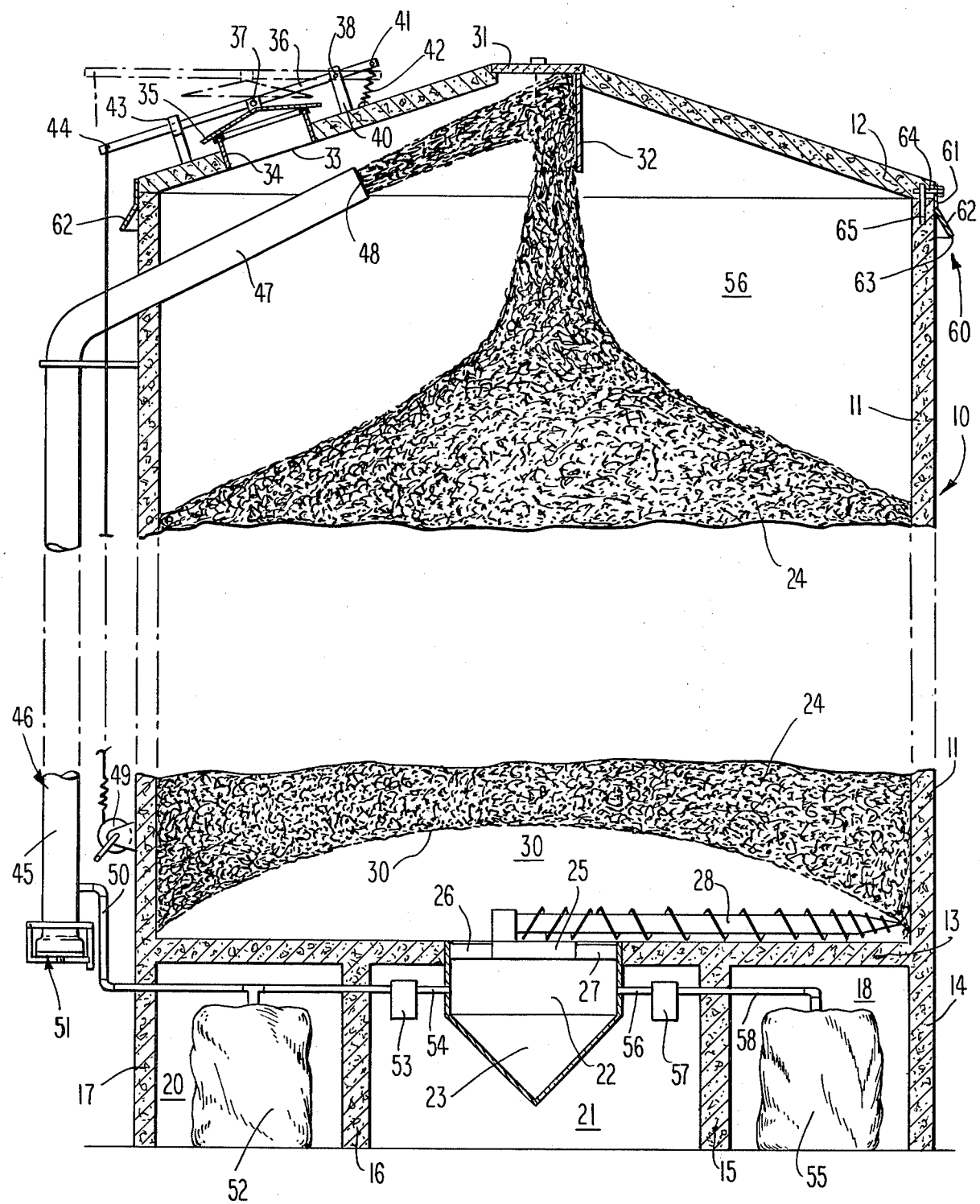

Referring now to the drawings in detail, reference is first made to FIG. 1, wherein there is illustrated a silo generally designated by the numeral 10, of poured concrete construction or the like, comprising a right circular cylindrical wall 11, and a domed roof 12. A floor 13 is provided in the silo, and a plurality of upstanding supports 14, 15, 16, and 17, also all of poured concrete construction, are provided, supporting the same and defining rooms or storage areas 18 and 20, and a central discharge zone 21.

At the center of the silo floor 13, there is provided a discharge chute 22, of sheet metal or like, cylindrical construction, that terminates at its lower end in a discharge cover 23. The discharge cover may be constructed like that shown in U.S. Pat. No. 4,057,153, if desired, and is openable and closeable upon discharge of silage 24 from the bottom of the silo. Mounted in the discharge chute 22 is an auger mount 25 that, in turn, is suitably carried at 26, 27 from the silo floor, and which mounts a radial inner end of an auger 28, for generally incremental sweeping motion across a silo floor as the auger turns. The auger drive may be constructed like that in U.S. Pat. No. 4,095,703, if desired, and the auger and auger opening may be constructed like that shown in U.S. Pat. No. 4,057,151, if desired. Generally, as the auger discharges silage, it creates a dome 30 at the bottom end of the silage 24 in the silo 10. Silage conveyed into the chute 22, and deposited into the zone 21 when the cover 23 is opened, is thereafter conveyed outwardly of the silo by a suitable conveyor (not shown) for use.

The roof 12 of the silo, like the sidewall 11 is of poured concrete construction, and has at its top central portion, a lid 31 and depending deflector 32, that may be constructed like the comparable structure in U.S. Pat. No. 4,052,108. The lid 31 is openable.

Also in the roof 12 of the silo, is a vent opening 33, circular in form, that has an upstanding sheet metal rim 34, with a frusto-conical closure 35, carried by a bar 36, pivotally at 37, with the bar 36 being in turn pivotally carried at 38 between upstanding posts 40 that in turn are rigidly carried by the roof 12. An overhanging end 41 of the bar 36 is spring-biased toward an opening position, by means of a spring 42 mounted at its end, and mounted at the lower end of a post 40. A pair of spaced apart guides 43 are adapted to receive the left-most end of the closure-carrying member 36 therein when the closure is in the closed position over the cylindrical opening 34. At the outer end of the member 36, is provided a cable connection 44 that, in turn, is connected to a conventional winch 49 that is manually operable for opening and closing the vent opening 33, by means of allowing the spring 42 to lift the bar 36, and consequently lift the closure 35 from the vent opening 33, when the winch 49 is turned an amount sufficient to allow the bar 36 to move from the full line position illustrated in FIG. 1, to the phantom line position thereof. Thus, when it is desired to inject or blow agricultural products into the silo 10, a suitable blower (not shown) for doing the same is hooked up to the lower end 45 of the fill pipe or conduit 46, for delivery of such products to the upper end of the silo, inside thereof, by means of passage through an extended delivery line or duct 47. The outer end 48 of the duct 47 extends generally radially inwardly of the silo wall 11, toward a central deflector 32, an amount beyond the radial-innermost portion of the vent opening 33, and generally centrally disposed beneath the vent opening 33, for delivery of the products that will comprise silage into the silo, at a location past the vent opening 33. It has been found that this will minimize or eliminate the carrying of silage and dust outwardly through the vent 33, when the filling operation is being done, in which case the vent 33 is opened due to the presence of the closure 35 in the phantom position illustrated in FIG. 1.

When the filling operation is completed, the winch 49 will be turned, and the vent closed again, to minimize possible contact with oxygen.

The lower end 45 of the fill tube 46 is vented by means of the vent line 50 connected thereto at a location above the bottom thereof, or above the closure 51, with the vent line 50 passing through the wall 17, into a collapsible silo gas bag 52, for communication therewith, and then through a moisture trap 53 to the discharge chute 22, via vent line 54. The discharge chute 22 is likewise in communication with a vent bag 55 via line 56, moisture trap 57, and vent line 58. With the fill tube 46 being completely sealed outside the silo 10, except for the openable closure 51, when the closure 51 is in closed position, there is intercommunication between the unfilled zone 56 at the top of the silo, the unfilled dome-shaped zone 30 at the bottom of the silo (through the chute 22, and the bags 52 and 55, via the lines 50, 54, and 56, 58. At the upper end of the fill tube 46, there is no closure member restricting communication between the interior of the fill tube 46 and the upper end interior zone 56 of the silo 10.

A sheet metal drip member 60 is provided, circumferentially disposed around the silo, which consists of an upstanding cylindrical surface 61 disposed about the periphery of the roof 12, and an outwardly and downwardly depending frusto-conical sheet member 62 connected therewith, defining therewith an angle of about 135 degrees when viewed in vertical section. The member 60 may be of sheet steel, sheet plastic, or sheet aluminum construction or the like, and will have the lower edge 63 thereof functioning as a drip edge, for conveyance of particulate material in rain, snow, or the like thereover, as it is carried from the roof 12, downwardly over the edge 63 of the drip member 60, such that droplets and the like will be dropped from the roof, at a location outwardly of the silo wall 11, rather than being permitted to run directly down the silo wall 11. The cylindrical portion 61 of the member 60 is bolted by means of bolts 64 to tie-rod members 65 that in turn are embedded in the concrete of the walls 11. In the construction of the silo, before the roof 12 is poured, but after the walls 11 are poured and the members 65 embedded therein, the member 60 may be secured to the members 65 at various locations around the upper end of the silo, and the upstanding cylindrical portion 61 of the member 60 may then be used as a peripheral form for facilitating the pouring of the concrete roof 12. After the roof has been poured, and when the silo is being used, it will be seen that the drip member 60, by locating the drip edge 63 remote from the silo, facilitates the continued good aesthetic appearance of the silo, free of drip stains down the side of the silo from its upper end, that could otherwise take place.

Figure 2:
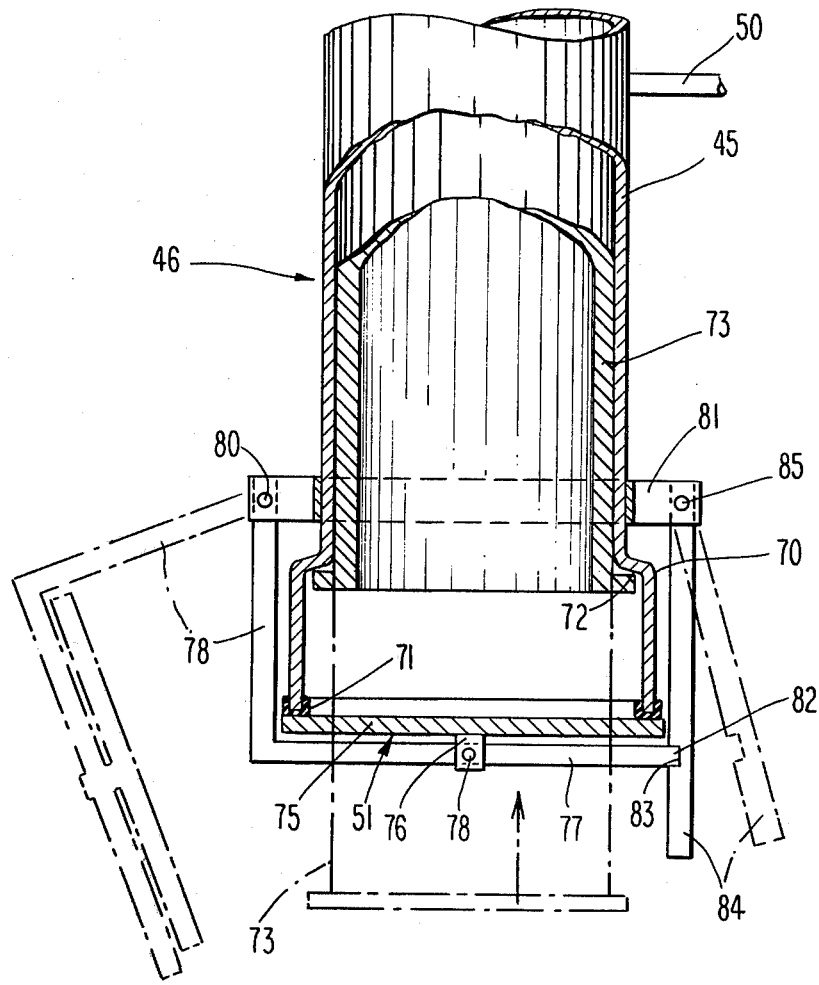

With reference to FIG. 2, an enlarged view of the lower end of the fill pipe 45 is made possible, and it will be seen that the lower end 45 has an enlarged or bell-shaped portion 70 that expands in diameter and terminates at a lower end 71. Located inside the lower end, is a tubular conduit member, generally cylindrical in construction, having an open upper end, and an outwardly flanged lower end 72, for receipt within the enlarged bell-shaped opening 70 of member 45. The telescopic inner member 73 may thus be engaged and moved downwardly, as illustrated in phantom in FIG. 2, until suitable stops (not shown) prevent downward motion any further, such that a blower-filler for blowing silage into the top of the silo, may be engaged therewith in conventional manner between the full open and full closed positions illustrated for member 73. Except for its communication with the interior of the upper end of the silo, the fill pipe or duct 46, is sealed closed, except for the opening of a lid or sealing closure member 75. The closure member 75 is carried at its lower end by a bar 76 that, in turn, is pivotally connected to a cross bar 77 at 78 which cross bar 77 has an upwardly extending arm 78 in turn pivotally connected at 80 to a collar 81 carried around the lower end 45 of conduit 46. An outwardly protruding portion 82 of the bar 77 is engageable by means of complementally shaped opening 83, with a manually actuable lever 84 that, in turn, is pivotally connected at 85 with the collar 81. It is thus seen that the member 84 may be grasped and moved counterclockwise as illustrated in FIG. 2, permitting the bar 71 and its carried sealing closure member 75 thereof to be pivoted out of the way, or clockwise about the pivot 80, as viewed in FIG. 2, to permit access to the housed telescopically openable member 73 located in the lower end 45 of the duct 46. It will thus be seen that means is amply provided for connection of a suitable silage fill apparatus (not shown) to the lower end of the fill duct 46.

It will be understood herein that while the term "silage" has been used frequently, to indicate an agricultural product for warehousing or storage in a silo, it will be further understood that this term is to be construed in its broadest possible sense, to also include agricultural products which, though not yet silage, will or are intended to become silage at some point. Accordingly, hay, grain, and all matters of agricultural products, including corn and the like are intended to be included herein, although not specifically mentioned. Also, various modifications may be made in the details of construction, as well as the use and operation of the device of this invention, all within the spirit and scope of the invention as defined in the appended claims.

What is claimed is:

1. In a storage silo for agricultural products and the like, being sealed from the outside environment, wherein the silo is of the type designed for storage of silage for substantial periods without aeration, and in which there is reduced oxygen content, relatively high heat, and relatively high humidity, and wherein materials may be stored without danger of oxidation, having an upstanding wall and a roof on its upper end, wherein the silo is of the bottom unloader type having unloader means at the lower end of the silo for unloading silage therefrom, conduit means communicatively connecting the upper and lower inner ends of the silo, for substantially equalizing pressure in the silo above and below silage located therein, the conduit means allowing free flow of gas in either direction within the conduit means, said conduit means comprising a fill pipe for delivering agricultural products into the top of the silo, wherein said conduit means traverses the silo between its upper and lower ends, outside the silo, the conduit means at its upper end being free of any closure preventing communication between the conduit means and the top of the silo; the conduit means also including a vent line communicatively interconnecting the lower end of the conduit means and the bottom of the silo; the conduit means being sealed against communication with the environment outside the silo, including sealing closure means at the lower end of the conduit means for sealingly closing off access to the conduit means when the conduit means is not in use as a delivery means, the sealing closure means thereby comprising means for maintaining the oxygen content of the interior of the silo at a substantially reduced level relative to atmospheric conditions, with said sealing closure means being arranged for sealing the lower end of the conduit means, said vent line being connected to said lower end of said conduit means, including at least one gas expansion bag for receiving silage gases therein, said bag being in communicative connection with said upper and lower ends of the silo through said vent line.

2. A silo in accordance with claim 1, said conduit means having a telescopically extensible portion at its lower end for extending the lower end of the conduit means before filling the silo.

3. A silo in accordance with claim 1, wherein said vent line is connected to said lower end of said conduit means above said sealing closure means an amount sufficient that the portion of said lower end of the conduit means beneath the location of connection of the vent line and above the sealing closure means comprises a moisture trap means.

4. A silo in accordance with claim 1, wherein said gas expansion bag is located in the silo beneath the floor thereof.

* * * * *